E. P. HERPIN.
HYDROCARBON BURNER.
APPLICATION FILED JAN. 4, 1911.
999,165.
Patented July 25, 1911.
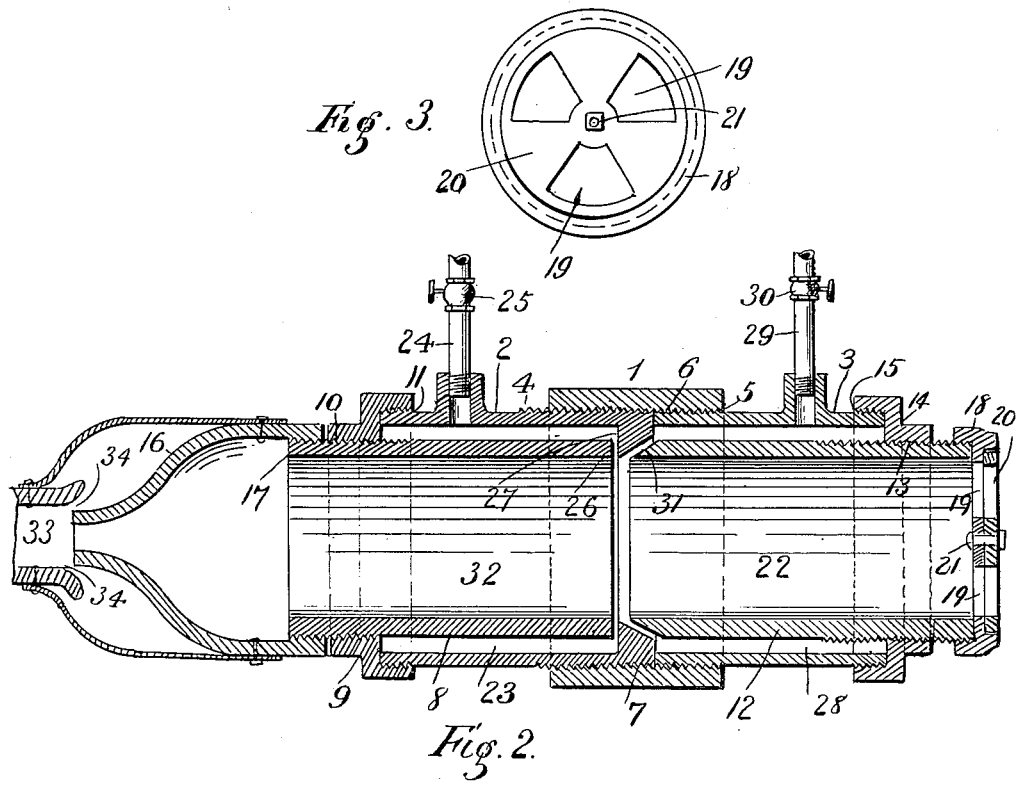
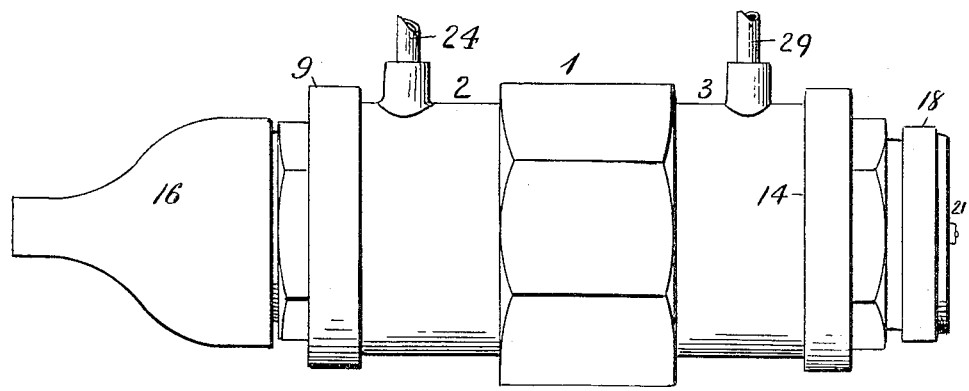
WITNESSES:
INVENTOR
E. P. Herpin.
BY
Attorney

UNITED STATES PATENT OFFICE.

EDWARD PETER HERPIN, OF TEAGUE, TEXAS, ASSIGNOR OF ONE-HALF TO JOSEPH WESLEY KAY, OF DALLAS, TEXAS.

HYDROCARBON-BURNER.

999,165. Specification of Letters Patent. Patented July 25, 1911.

Application filed January 4, 1911. Serial No. 600,786.

*To all whom it may concern:*

Be it known that I, EDWARD P. HERPIN, a citizen of the United States, residing at Teague, in the county of Freestone and State of Texas, have invented certain new and useful Improvements in Hydrocarbon-Burners; and I do hereby declare the following to be a full, clear, and exact description of the invention, such as will enable others skilled in the art to which it appertains to make and use the same.

My invention relates to hydrocarbon burners, has for its object increased efficiency by effecting a thorough commingling of the fluid and the liquid hydrocarbon within the burner, and the invention consists in certain improvements which will be fully disclosed in the following specification and claims.

In the accompanying drawings, which form part of this specification:—Figure 1 represents a side view of my improved burner. Fig. 2 is a longitudinal section partly in elevation and Fig. 3 is a rear end view.

Reference being had to the drawings and the designating characters thereon, the numeral 1 indicates a union which connects the front member 2 and the rear member 3 of the outer casing or body of the burner at their adjacent ends, which are provided with screw threads 4, 5, engaged by the screw thread 6 on the interior of the union. The member 2 is provided with a concentrically arranged projection 7, which will be hereinafter further described.

8 indicates an inner member concentrically arranged with relation to member 2, which is screw threaded at its outer end and secured to the member 2 by an annular internally screw-threaded nut 9 which engages the screw threads 10 on the member 8 and screw threads 11 on the member 2. 12 indicates a like inner member concentrically arranged with relation to member 3, which is screw threaded at 13 and is secured to the member 3 by a like annular nut 14 which engages the screw threads 13 and 15.

16 indicates the nozzle which is attached to the outer end of the member 2 by a screw threaded connection 17, and 18 indicates a cap or closure on the rear end of the member 3, provided with openings 19, controlled by a valve 20 revoluble thereon and secured by a rivet 21, for regulating the supply of air admitted to the supplemental air chamber 22 within the burner.

23 indicates an annular hydrocarbon chamber, provided with a supply pipe 24, controlled by a valve 25, and whose annular discharge passage 26 is at the rear end of said chamber 23 and preferably arranged at about a right angle to the axis of the burner, and is formed by one wall 27 of the projection 7 and the inner end of the member 8, by proper adjustment of the latter member to regulate the quantity of hydrocarbon delivered.

28 indicates an annular fluid chamber, such as steam or air, provided with a supply pipe 29 controlled by a valve 30, and whose annular discharge passage 31, is arranged at an angle to the axis of the burner and adjacent to the passage 26, to discharge fluid into the liquid issuing therefrom and thoroughly atomize, and disintegrate the liquid, to facilitate the commingling and combining of the mixture in the chamber 32 before it issues from the nozzle 16, and to draw air through the openings or passages 19, into the air chamber 22, to increase the supply of oxygen to the commingling chamber 32 and thereby enrich the mixture.

33 indicates a primary combustion chamber adjacent to the discharge end of the nozzle 16, into which the mixture from chamber 32 is discharged, where it is ignited and burns, additional oxygen to intensify combustion being supplied through the annular passage 34.

By the construction shown, the fluid, air, or air and steam is projected into the hydrocarbon issuing from the passage 26 and is thoroughly commingled therewith in the combining chamber 32 and issues through the nozzle 16 in a highly inflammable condition, is burned in the primary combustion chamber 33 and conducted to any place where it may be desired to use the heat.

In the application of the burner to a steam boiler, the burning gases in the chamber 33, are conducted into the furnace of the boiler, which then becomes a secondary combustion chamber.

The nozzle may be provided with a round discharge end or it may be flattened, to suit conditions.

Having thus fully described my invention, what I claim is—

1. A hydrocarbon burner comprising outer and inner concentrically arranged members, the inner members being separated transversely and longitudinally adjustable toward each other and forming a liquid chamber and a fluid chamber between said outer and inner members, said chambers having discharge passages adjacent to each other, a supplemental fluid chamber and a commingling chamber adjacent thereto and within the burner.

2. A hydrocarbon burner comprising outer and inner concentrically arranged members, the inner members being separated transversely and longitudinally adjustable toward each other, a liquid chamber and a fluid chamber between said outer and inner members, an annular discharge passage for the liquid chamber and an annular discharge passage for the fluid chamber adjacent to the liquid discharge passage and arranged at an angle thereto to project a stream of fluid into the issuing liquid, and a commingling chamber within the burner.

3. A hydrocarbon burner comprising outer concentrically arranged members connected at their adjacent ends, like inner members connected to the former members at their outer ends and separately longitudinally adjustable, a liquid chamber and a fluid chamber between said outer and inner members, a discharge passage for the liquid chamber arranged at approximately a right angle to the axis of the burner, and an inclined discharge passage for the fluid chamber adjacent to the liquid discharge passage, a supplemental fluid chamber, and a commingling chamber adjacent thereto and communicating therewith within the inner members.

4. A hydrocarbon burner comprising outer and inner concentrically arranged members, the inner members being separated transversely and longitudinally adjustable toward each other, a liquid and a primary fluid chamber between the outer and inner members having discharge passages adjacent to each other, and the discharge passage of the latter chamber arranged to project a stream into the liquid discharge from the first chamber, a supplemental fluid chamber, and a commingling chamber adjacent to and in communication therewith, said two chambers being within the said inner members.

5. A hydrocarbon burner comprising outer and inner concentrically arranged members provided with a liquid chamber and a primary fluid chamber, concentrically arranged and communicating supplemental fluid and combining chambers within said inner members, an annular liquid discharge passage, an annular fluid discharge passage from the primary fluid chamber and in proximity to the liquid discharge passage and at an angle thereto, whereby the fluid is projected into the liquid.

6. A hydrocarbon burner comprising outer and inner concentrically arranged members, the inner members being separated transversely and longitudinally adjustable, a liquid chamber and a fluid chamber between said outer and inner members, means for supplying hydrocarbon to the liquid chamber, means for supplying fluid to the fluid chamber, a supplemental fluid chamber, a commingling chamber adjacent thereto and within the burner, and a primary combustion chamber adjacent to the nozzle of the burner and provided with a passage for supplying additional oxygen.

7. A hydrocarbon burner comprising outer and inner concentrically arranged members, liquid and fluid chambers between said outer and inner members, a fixed member projecting between and separating said chambers and the inner concentric members being longitudinally adjustable with relation to said fixed member.

8. A hydrocarbon burner comprising outer and inner concentrically arranged members, liquid and fluid chambers between said outer and inner members and one of which outer members is provided with an inwardly projecting concentric member, the inner concentric members being separated transversely and longitudinally adjustable with relation to said fixed member, annular passages at the adjacent ends of the adjustable members, and an air chamber and a commingling chamber within the burner.

9. A hydrocarbon burner comprising outer and inner concentrically arranged tubular members, the inner members being separated and longitudinally adjustable, a fixed member between the adjacent ends of said inner members, passages between the inner members and said fixed member, one of which passages is inclined toward the other passage, chambers between said concentrically arranged members, and an air chamber and a commingling chamber within the burner.

In testimony whereof I affix my signature, in presence of two witnesses.

EDWARD PETER HERPIN.

Witnesses:
E. B. W. CLOIS,
ROBT. F. RILEY.